UNITED STATES PATENT OFFICE.

GERHARD NICOLAAS VIS, OF CUISE-LAMOTTE, FRANCE.

PROCESS OF MANUFACTURING AMMONIUM SULFATE.

1,152,244.  Specification of Letters Patent.  Patented Aug. 31, 1915.

No Drawing.  Application filed June 7, 1911.  Serial No. 631,799.

*To all whom it may concern:*

Be it known that I, GERHARD NICOLAAS VIS, a subject of the Queen of the Netherlands, of Cuise-Lamotte, France, and whose post-office address is Cuise-Lamotte, Oise, Republic of France, have invented a new and useful Process of Manufacturing Ammonium Sulfate; and I do hereby declare that the following is a full, clear, and exact description of my invention, which will enable others skilled in the art to which it appertains to make and use the same.

This invention relates to the manufacture of ammonium sulfate and it has for its object to enable this compound to be obtained in a far more economical manner than heretofore.

It consists in the hereinafter described improved process of producing ammonium sulfate by causing gypsum (hydrated sulfate of calcium) to react with ammonium carbonate under conditions adapted to directly produce a concentrated lye of pure ammonium sulfate without evaporation of water.

It is well known, that ammonium sulfate can be obtained by converting ammonium carbonate with readily soluble sulfates such as alum, as well as with sulfates which only dissolve with difficulty such as gypsum that is to say hydrated calcium sulfate (Graham Otto, 5th ed., 3 div., pag. 482). Both reactions have been proposed for obtaining ammonium sulfate from gas liquor, the stoichiometrical amount of alum being added to the gas liquor in the first method and the gas liquor being passed repeatedly through a layer of gypsum in the second method. Neither of the two proposals however attained technical importance and in practice ammonium sulfate is prepared now as before by the reaction of ammonia vapors on sulfuric acid.

The directions given by Graham Otto at the above cited passage of literature for the use of gypsum, according to which the gas liquor has to be passed repeatedly through a layer of gypsum, must on account of the difficulty with which gypsum dissolves in water lead to the assumption, that the reaction between it and the ammonium carbonate requires besides a long time a large amount of water, so that only dilute solutions can be obtained, because it must be expected that after the formation of a certain amount of ammonium sulfate, an equilibrium results and that this on account of the slight solubility of gypsum in water, occurs at a very low concentration of ammonium sulfate. According to this the said process, which could not even obtain any importance for the treatment of gas liquor was bound to prove unsuitable for the production of ammonium sulfate on a manufacturing scale, on account of the great cost of evaporation which was evidently attached to it. Furthermore this process is absolutely technically impossible because on evaporation of the ammonium sulfate solution the free ammonia contained in large quantity in the gas liquor (and which as is well known does not react with gypsum to form sulfate) is lost. Now I have discovered the very surprising fact that the conversion of gypsum with ammonium carbonate into ammonium sulfate can be quickly and smoothly effected by using a concentrated solution of ammonium carbonate and that under this condition the reaction goes on even in a saturated solution of ammonium sulfate with the effect that finally ammonium sulfate is precipitated. If for instance finely powdered gypsum and ammonium carbonate are mixed together and if an amount of water is added, which is by far insufficient to dissolve the corresponding amount of ammonium sulfate, very soon a reaction takes place, which continues as long as ammonium carbonate and calcium sulfate are present in sufficient quantities, whereby ammonium sulfate is precipitated. The gypsum need not even be finely divided. In a concentrated solution of ammonium carbonate, pieces of hazelnut size are converted, although slowly, to calcium carbonate and ammonium sulfate.

The new process makes it possible to directly and easily obtain solutions of ammonium sulfate which contain 70 kilos of sulfate and even more in 100 kilos of water and which can even be saturated with ammonium sulfate at any temperature. The product of reaction is thereby obtained with so high a degree of purity, that it can be directly used as commercial product.

The present invention therefore broadly consists in carrying out the well known reaction between ammonium carbonate and gypsum in concentrated solutions for the production of ammonium sulfate on a manufacturing scale.

As an example of carrying out the invention ammonium carbonate in any suitable form is dissolved in water. The concentrated solution is brought together and mixed with gypsum reduced to a fine powder. A thickening of the whole mass takes place and after a short time calcium carbonate is precipitated, whereas ammonium sulfate is found to be present in the liquid. If the ammonium carbonate is employed in the form of an acid salt carbon dioxid is briskly evolved and the solution contains ammonium sulfate mixed with a little calcium bicarbonate which as is well known can be reduced by boiling to calcium monocarbonate which separates out.

Another very advantageous way of carrying out the new process is the following:— Gaseous carbon dioxid for instance in the form of furnace gases (containing 10 to 15% carbon dioxid) and ammonia vapors for instance derived from the waste waters of gas-, coke works, and the like, are passed through a watery suspension of gypsum. The reaction is carried through in such manner that it corresponds to the following equation:—

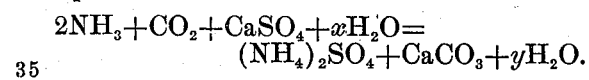

$$2NH_3 + CO_2 + CaSO_4 + xH_2O = (NH_4)_2SO_4 + CaCO_3 + yH_2O.$$

However an excess of carbon dioxid may be employed, in order to avoid ammonia being carried away by the escaping inert gases.

A third way of carrying out the new process consists in leading a watery solution of ammonia as concentrated as possible such for instance as is obtained from the stills of gas works, into a thick watery suspension of gypsum into which simultaneously carbon dioxid or furnace gases are passed, care being taken, that the carbon dioxid is always present in excess. The gypsum is kept in suspension by means of stirrers and if necessary calcium bicarbonate present in the solution obtained is decomposed by boiling. The whole mass is then filtered by means of a filtering press. If desired the clear solution may be evaporated to obtain ammonium sulfate in the solid form.

Having fully described my invention, what I desire to claim, and secure by Letters Patent of the United States, is:—

1. The process of manufacturing ammonium sulfate consisting in producing a concentrated solution of ammonium sulfate and subjecting in said concentrated solution gypsum to the action of ammonium carbonate, and separating the ammonium sulfate produced thereby from the calcium carbonate.

2. The process of manufacturing ammonium sulfate consisting in producing a concentrated solution of ammonium sulfate of at least thirty per cent. concentration and subjecting in said concentrated solution gypsum to the action of ammonium carbonate and separating the ammonium sulfate produced thereby from the calcium carbonate.

3. The process of manufacturing ammonium sulfate consisting in producing a concentrated solution of ammonium sulfate and subjecting in said concentrated solution gypsum to the action of ammonium carbonate stirring, the mass produced thereby and separating the ammonium sulfate from the calcium carbonate.

4. The process of manufacturing ammonium sulfate consisting in producing a concentrated solution of ammonium sulfate of at least thirty per cent. concentration and subjecting in said concentrated solution gypsum to the action of ammonium carbonate stirring the mass and separating the ammonium sulfate produced from the calcium carbonate.

5. The process of manufacturing ammonium sulfate consisting in emulsifying gypsum in water and subjecting such emulsion to the action of ammonium carbonate thereby forming a concentrated solution of ammonium sulfate and subjecting gypsum to the action of ammonium carbonate in said concentrated solution and separating the ammonium sulfate produced thereby from the calcium sulfate.

6. The process of manufacturing ammonium sulfate consisting in emulsifying gypsum in water and subjecting such emulsion to the action of ammonium carbonate thereby forming a concentrated solution of ammonium sulfate of at least thirty per cent. concentration and subjecting gypsum to the action of ammonium carbonate in said concentrated solution, and separating the ammonium sulfate produced thereby from the calcium sulfate.

7. The process of manufacturing ammonium sulfate consisting in emulsifying gypsum in water and subjecting such emulsion to the action of ammonium carbonate thereby forming a concentrated solution of ammonium sulfate and subjecting gypsum to the action of ammonium carbonate in said concentrated solution, stirring the mass and separating the ammonium sulfate produced thereby from the calcium sulfate.

8. The process of manufacturing ammonium sulfate consisting in emulsifying gypsum in water and subjecting such emulsion to the action of ammonium carbonate thereby forming a concentrated solution of ammonium sulfate of at least thirty per cent. concentration and subjecting gypsum to the action of ammonium carbonate in said concentrated solution, stirring the mass and separating the ammonium sulfate produced thereby from the calcium sulfate.

In testimony whereof I have hereunto set my hand in presence of two subscribing witnesses.

GERHARD NICOLAAS VIS.

Witnesses:
 MARCEL DENIS,
 AUGUST OOSTERMAN.